(12) United States Patent
Peng et al.

(10) Patent No.: US 11,831,459 B2
(45) Date of Patent: Nov. 28, 2023

(54) CONTROL METHOD AND DEVICE FOR HOME DEVICE AND STORAGE MEDIUM

(71) Applicant: Beijing Xiaomi Mobile Software Co., Ltd., Beijing (CN)

(72) Inventors: Cong Peng, Beijing (CN); Wenjun Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 225 days.

(21) Appl. No.: 16/898,766

(22) Filed: Jun. 11, 2020

(65) Prior Publication Data

US 2021/0226810 A1    Jul. 22, 2021

(30) Foreign Application Priority Data

Jan. 17, 2020  (CN) .......................... 202010051701.3

(51) Int. Cl.
*G01S 7/41* (2006.01)
*H04L 12/28* (2006.01)
*G01S 13/08* (2006.01)

(52) U.S. Cl.
CPC .......... *H04L 12/2803* (2013.01); *G01S 7/411* (2013.01); *G01S 7/415* (2013.01); *G01S 13/08* (2013.01)

(58) Field of Classification Search
CPC ................................................ H04L 12/2803
See application file for complete search history.

(56) References Cited

U.S. PATENT DOCUMENTS

| 10,378,706 | B1* | 8/2019 | Chen ....................... F21V 21/34 |
| 2013/0183944 | A1 | 7/2013 | Mozer et al. |
| 2015/0277569 | A1* | 10/2015 | Sprenger ................. G06F 3/017 345/156 |
| 2016/0259037 | A1* | 9/2016 | Molchanov ............ G06V 40/28 |
| 2017/0060254 | A1 | 3/2017 | Molchanov et al. |
| 2018/0232902 | A1* | 8/2018 | Albadawi ............. A61B 5/1113 |
| 2018/0341333 | A1 | 11/2018 | Molchanov et al. |
| 2019/0086890 | A1* | 3/2019 | Bradley ................. B05B 1/185 |
| 2020/0133453 | A1* | 4/2020 | Walker .................... G06F 9/542 |

(Continued)

FOREIGN PATENT DOCUMENTS

| CN | 102801909 A | 11/2012 |
| CN | 106055089 A | 10/2016 |

(Continued)

OTHER PUBLICATIONS

Extended European Search Report dated Jun. 11, 2021 in European Patent Application No. 21151536.6, 8 pages.

(Continued)

*Primary Examiner* — Timothy A Brainard
*Assistant Examiner* — Hailey R Le
(74) *Attorney, Agent, or Firm* — Oblon, McClelland, Maier & Neustadt, L.L.P.

(57) ABSTRACT

The present disclosure provides a control method and device for a home device and a storage medium. The control method for the home device can include monitoring an action of a user through a radar wave emitted from the radar wave sensor, and controlling the home device to perform a function corresponding to the action of the user in response to monitoring that the action of the user matches a preset action.

8 Claims, 6 Drawing Sheets

(56) References Cited

U.S. PATENT DOCUMENTS

2020/0327315 A1* 10/2020 Mullins .............. G08B 13/1968
2021/0103031 A1*  4/2021 Cohen ..................... G01S 7/417
2022/0012470 A1*  1/2022 Koishida .............. G06V 40/103

FOREIGN PATENT DOCUMENTS

| CN | 107710012 A |   | 2/2018  |
|----|-------------|---|---------|
| CN | 108700645 A |   | 10/2018 |
| CN | 109708264 A |   | 5/2019  |
| CN | 109857251 A |   | 6/2019  |
| CN | 109871125 A | * | 6/2019  |
| CN | 110687816 A |   | 1/2020  |

OTHER PUBLICATIONS

Combined Chinese Office Action and Search Report dated Apr. 26, 2022 in Chinese Patent Application No. 202010051701.3, 8 pages.
Third Office Action dated Jun. 6, 2023, issued in corresponding Chinese patent application No. 202010051701.3 citing documents 15-16.

* cited by examiner

CONTROL METHOD AND DEVICE FOR HOME DEVICE AND STORAGE MEDIUM

CROSS-REFERENCE TO RELATED APPLICATIONS

The present application claims priority to the Chinese Patent Application No. 202010051701.3, titled "CONTROL METHOD AND DEVICE FOR HOME DEVICE AND STORAGE MEDIUM" and filed on Jan. 17, 2020, the entire contents of which are incorporated herein by reference.

TECHNICAL FIELD

The present disclosure relates to the field of smart home technology, and in particular, to a control method and device for a home device and a storage medium.

BACKGROUND

Smart home devices are increasingly being used in a large number of households, and voice control is a very convenient way for controlling such smart home devices. However, it can be inconvenient or not possible for users to speak sometimes. In such case, the users are required to control the smart home devices in a non-voice manner.

SUMMARY

The present disclosure is to provide a control method and device for a home device and a storage medium.

According to a first aspect of the present disclosure, there is provided a control method for a home device having a radar wave sensor. The control method for the home device can include monitoring an action of a user through a radar wave emitted from the radar wave sensor, and controlling the home device to perform a function corresponding to the action of the user in response to monitoring that the action of the user matches a preset action.

In an implementation, the control method for the home device can further include recognizing a distance between the user and the home device through the radar wave emitted from the radar wave sensor and monitoring the action of the user through the radar wave emitted from the radar wave sensor in response to recognizing by the radar wave sensor that the user is within a specified distance.

In another implementation, the control method for the home device further includes, before the step of controlling the home device to perform a function corresponding to the action of the user in response to monitoring that the action of the user matches a preset action, recognizing a body contour of the user through the radar wave emitted from the radar wave sensor, and determining that a recognized body contour is a specified body contour.

In still another implementation, the control method for the home device can further include recognizing a distance between the user and the home device through the radar wave emitted from the radar wave sensor, and controlling the home device to turn off power in response to recognizing by the radar wave sensor that the user is out of a specified distance.

In still another implementation, the control method for the home device can further include presetting a correspondence between the action of the user and the function performed by the home device.

In still another implementation, the control method for the home device can further includes issuing prompt information in response to monitoring that the action of the user does not match the preset action. The prompt information is configured to prompt the user that the action of the user does not match the preset action.

According to a second aspect of the present disclosure, there is provided a control device for a home device. The home device is provided with a radar wave sensor. The control device for the home device can include a monitoring module that is configured to monitor an action of a user through a radar wave emitted from the radar wave sensor and a processing module that is configured to control the home device to perform a function corresponding to the action of the user in response to monitoring that the action of the user matches a preset action.

In an implementation, the monitoring module can be further configured to recognize a distance between the user and the home device through the radar wave emitted from the radar wave sensor, and monitor the action of the user through the radar wave emitted from the radar wave sensor in response to recognizing by the radar wave sensor that the user is within a specified distance.

In another implementation, the monitoring module is further configured to recognize a body contour of the user through the radar wave emitted from the radar wave sensor, and determine that a recognized body contour is a specified body contour.

In still another implementation, the monitoring module can be further configured to recognize a distance between the user and the home device through the radar wave emitted from the radar wave sensor, and the processing module is further configured to control the home device to turn off power in response to recognizing by the radar wave sensor that the user is out of a specified distance.

Further, the control device for the home device further includes: a presetting module, configured to preset a correspondence between the action of the user and the function performed by the home device.

Additionally, the processing module can be further configured to issue prompt information in response to monitoring that the action of the user does not match the preset action, and the prompt information is configured to prompt the user that the action of the user does not match the preset action.

According to a third aspect of the present disclosure, there is provided a control device for a home device. The control device can include a memory that is configured to store instructions, and a processor that is configured to call the instructions to execute the control method for the home device according to the first aspect or any implementation of the first aspect.

According to a fourth aspect of the present disclosure, there is provided a non-transitory computer-readable storage medium, storing thereon computer-executable instructions, that when executed by a processor, execute the control method for the home device according to the first aspect or any implementation of the first aspect.

It should be noted that the above general description and the following detailed description are merely exemplary and explanatory, and should not be construed as limiting of the present disclosure.

BRIEF DESCRIPTION OF THE DRAWINGS

The drawings herein are incorporated into and constitute a part of the specification, illustrate embodiments conforming to the present disclosure, and serve to, together with the specification, explain principles of the present disclosure.

DETAILED DESCRIPTION

Figure 1:
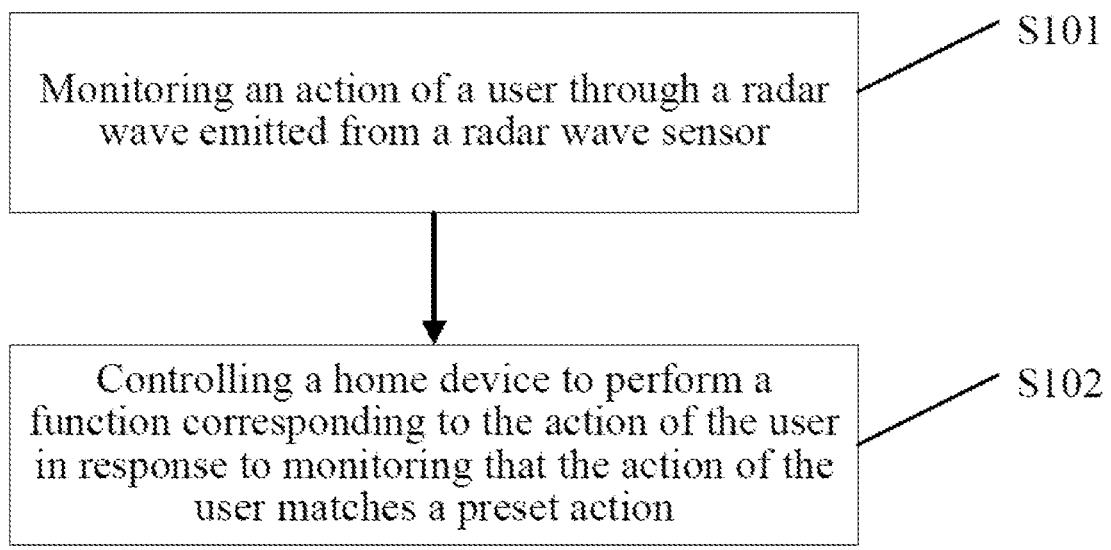
FIG. 1 is a flowchart of a control method for a home device according to an exemplary embodiment of the present disclosure.

Exemplary embodiments will be described in detail here, examples of which are shown in the drawings. In the following description with reference to the drawings, unless otherwise indicated, the same numerals in different drawings represent the same or similar elements. The implementations described in the following exemplary embodiments do not represent all implementations consistent with the present disclosure. Rather, they are merely examples of devices and methods consistent with some aspects of the present disclosure as recited in the appended claims.

Smart home is an embodiment of the Internet of Things technologies under the Internet. The smart home connects various devices in the home through the Internet of Things technology, and provides various functions and means, such as home appliance control, lighting control, air conditioning control, and anti-theft alarming.

At present, a smart home device may be controlled through voice. However, it is inconvenient or not possible for users to speak sometimes in life. In such case, the users have the need to control the smart home devices in a non-voice manner.

The present disclosure provides a control method for a home device, which may control the home device based on an action of a user monitored by a radar wave, and may optimize control for the home device in the scene where voice control for the home device is inconvenient.

FIG. 1 is a flowchart of a control method for a home device according to an exemplary embodiment of the present disclosure. The control method for the home device provided by the present disclosure can be applied to a home device which is provided with a radar wave sensor. In an exemplary embodiment of the present disclosure, as shown in FIG. 1, the control method for the home device includes steps S101 and S102. The steps S101 and S102 will be described respectively below.

In step S101, an action of a user is monitored through a radar wave emitted from the radar wave sensor. After the radar wave sensor emits the radar wave, the radar wave sensor may, within an effect range thereof, measure a distance, recognize an object or monitor the action of the user by receiving a linear frequency-modulated signal echo.

The radar wave sensor may emit the radar wave to monitor the action of the user at the current time. When the radar wave sensor continuously emits the radar wave, the radar wave is reflected when meeting a human body or an object to form echo. The radar wave sensor receives a continuous linear frequency-modulated signal echo, so that a continuous entire contour of the user may be monitored in real time. The action of the user may be monitored by monitoring the obtained continuous contour of the user to obtain the action of the user. Compared with other devices that can measure the distance, recognize the object or monitor the action of the user, the effective monitoring range of the radar wave sensor is wider, and the surroundings of the radar wave sensor can be understood as the effective monitoring range of the radar wave sensor. Because the radar wave sensor emits the radar wave to measure the distance, recognize the object or monitor the action of the user, the monitoring may be realized with less influence from an external environment. For example, the radar wave sensor may complete a monitoring task in a dark condition.

Different actions of the user may be distinguished from each other by the radar wave emitted by the radar wave sensor. Further, when the action of the user is monitored based on the radar wave emitted from the radar wave sensor, it may be not necessary to limit the user to be at a certain orientation of the radar wave sensor, so it may achieve the monitoring of the action of the user at all orientations, which may improve the accuracy of the monitoring of the action of the user.

In step S102, the home device is controlled to perform a function corresponding to the action of the user in response to monitoring that the action of the user matches a preset action. The function performed by the home device can match the preset action. Further, the functions performed by the home device can correspond to the preset actions one by one. The correspondence between the function of the home device and the preset action may be set according to actual needs.

Here, after the home device detects the action of the user, it is determined whether the detected action of the user matches the preset action. When the detected action of the user matches the preset action, the smart home device is controlled to perform the function corresponding to the preset action in response to the detected action of the user.

In the control method for the home device of the present disclosure, the action of the user is monitored by the radar wave emitted by the radar wave sensor, and the home device is controlled to perform a function corresponding to the action of the user in response to monitoring that the action of the user action matches the preset action. The action of the user may be monitored at all orientations through the radar wave, which improves the accuracy of the monitoring of the action of the user. In the present disclosure, it is realized that the home device is controlled based on the action of the user monitored by the radar wave, and thus that control for the home device in the scene where voice control for the home device is inconvenient is optimized.

Figure 2:
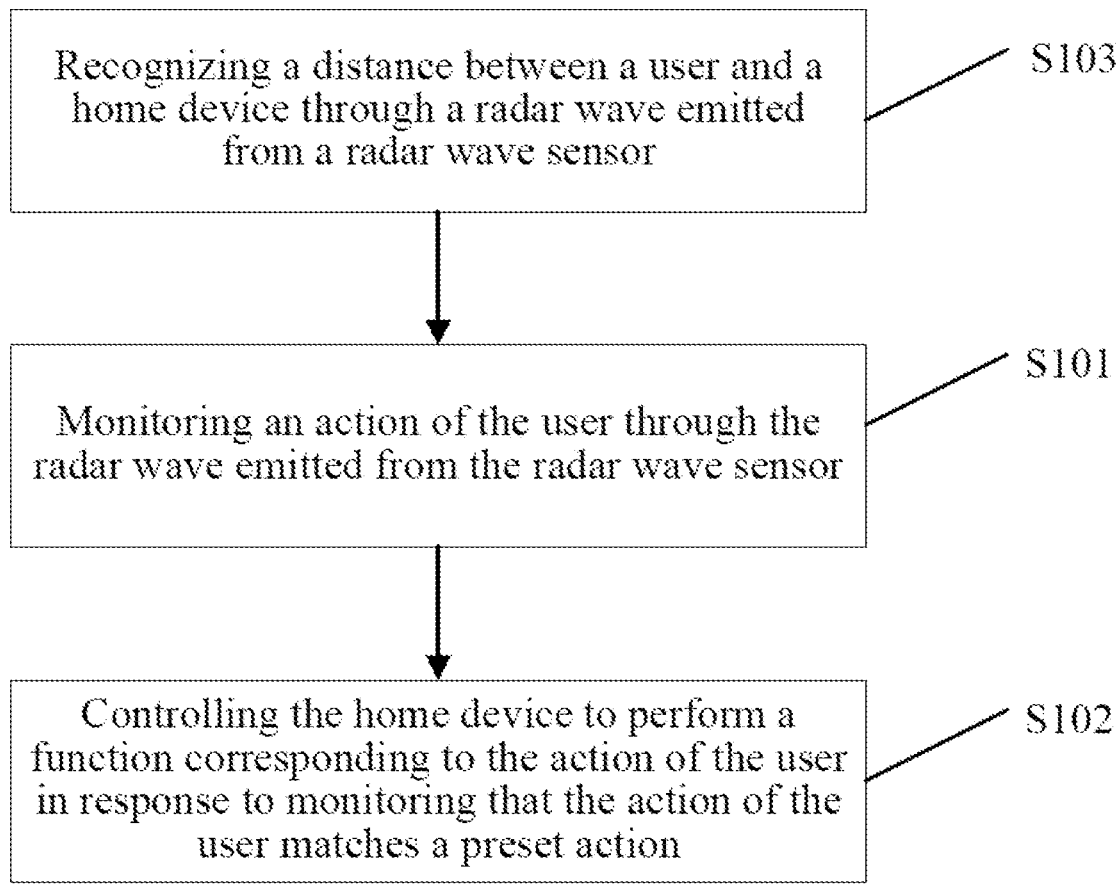
FIG. 2 is a flowchart of another control method for a home device according to an exemplary embodiment of the present disclosure.

FIG. 2 is a flowchart of another control method for a home device according to an exemplary embodiment of the present disclosure. The action of the user around the home device may be understood as a way showing that the user intends to control the function of the home device. Therefore, it is of great importance for controlling the home device in a non-voice manner that the action of the user is monitored around the home device and the home device is controlled to perform the function corresponding to the action of the user in response to monitoring that the action of the user matches a preset action.

In an exemplary embodiment of the present disclosure, as shown in FIG. 2, the control method for the home device further includes step S103. The step S103 will be described below.

In step S103, a distance between the user and the home device is recognized through the radar wave emitted from the radar wave sensor. The action of the user is monitored through the radar wave emitted from the radar wave sensor in response to recognizing by the radar wave sensor that the user is within a specified distance. When it is recognized by the radar wave that the user is out of the specified distance, the home device is not controlled to perform the function corresponding to the action of the user even if the action of the user is monitored to match the preset action.

The distance between the user and the home device is recognized through the radar wave emitted from the radar wave sensor, which may achieve an accurate measurement between the user and the home device. The specified distance may be set according to actual conditions, which is not specifically limited in the present disclosure.

In the present disclosure, when the action of the user is monitored through the radar wave emitted from the radar wave sensor in response to recognizing by the radar wave sensor that the user is within the specified distance, on one hand, it can effectively eliminate the interference of the action of the user out of the specified distance with the function control of the home device; on the other hand, it is not necessary to limit the user to be at a certain orientation of the radar wave sensor, which then can achieve the monitoring of the action of the user at all orientations, and thus the accuracy of the monitoring of the action of the user is improved.

Figure 3:
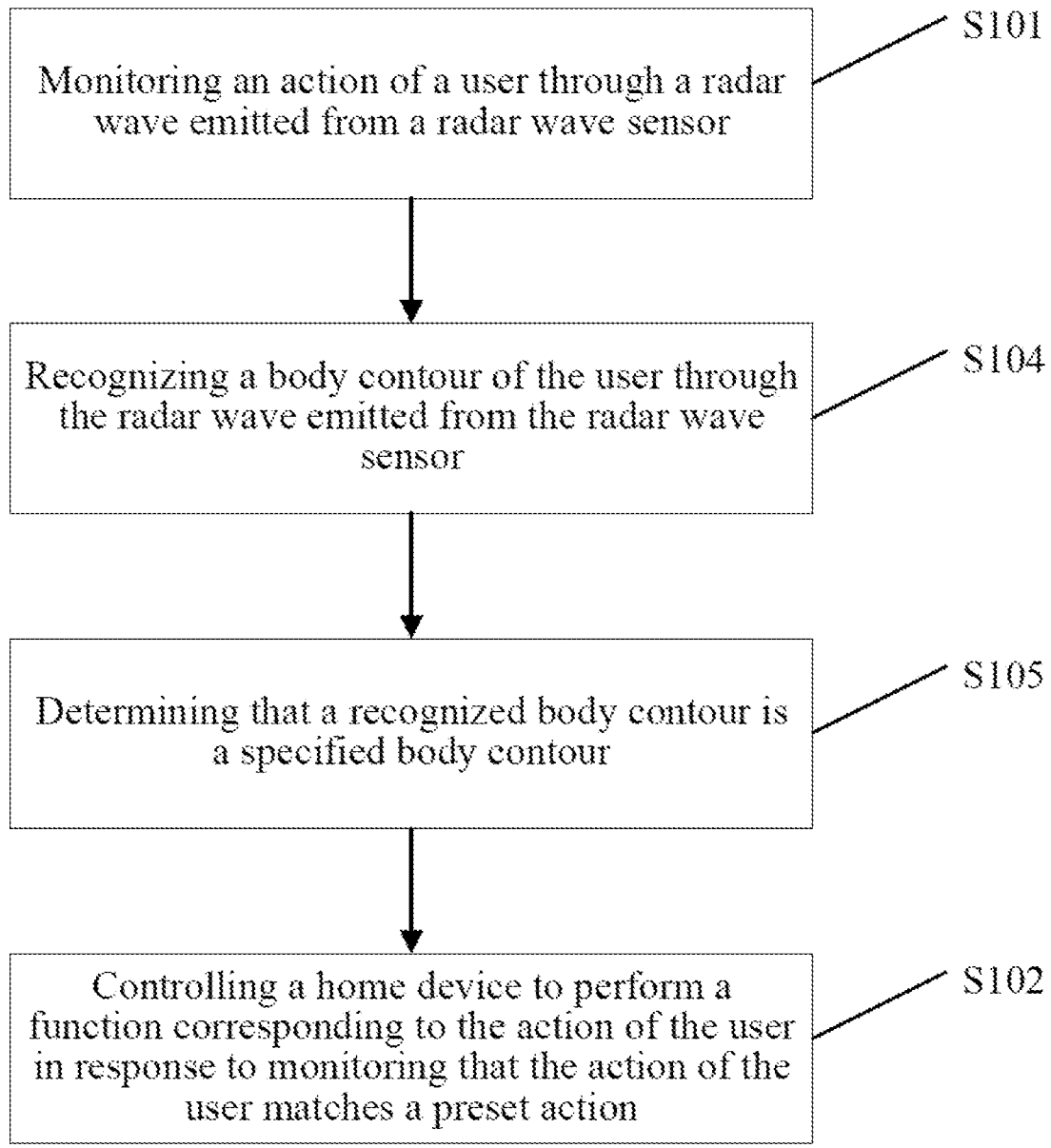
FIG. 3 is a flowchart of still another control method for a home device according to an exemplary embodiment of the present disclosure.

FIG. 3 is a flowchart of another control method for a home device according to an exemplary embodiment of the present disclosure.

In an exemplary embodiment of the present disclosure, as shown in FIG. 3, before step S102, the control method for the home device further includes steps S104 and S105. The steps S104 and S105 will be described respectively below.

In step S104, a body contour of the user is recognized through the radar wave emitted from the radar wave sensor.

In step S105, it is determined that a recognized body contour is a specified body contour.

Before controlling the home device to perform the function corresponding to the action of the user in response to monitoring that the action of the user matches the preset action, the body contour of the user is further recognized through the radar wave emitted from the radar wave sensor. Only when the recognized body contour is the specified body contour, the home device is controlled to perform the function corresponding to the action of the user in response to monitoring that the action of the user corresponding to the specified body contour matches the preset action.

The specified body contour may be understood as the body contour of the user using the home device. The specified body contour may be set according to actual conditions, for example, it may set one or more of the specified body contours.

In this embodiment, it may effectively prevent a non-user of the home device from controlling the function of the home device.

In an exemplary embodiment of the present disclosure, the control method for the home device further includes: recognizing a distance between the user and the home device through the radar wave emitted from the radar wave sensor; and controlling the home device to turn off power in response to recognizing by the radar wave sensor that the user is out of a specified distance.

When the home device is in a working state, if it is monitored that the user is away, the home device is controlled to perform the operation of turning off the power.

In an embodiment, the distance between the user and the home device may be recognized by the radar wave emitted from the radar wave sensor, and if it is recognized that the user is out of the specified distance range for all preset duration, the home device is controlled to perform the operation of turning off the power. In this way, energy consumption of the home device may be effectively saved in the case where the user forgets to turn off the home device when leaving.

The specified distance and the preset duration may be set according to actual conditions, which are not specifically limited in the present disclosure.

In an exemplary embodiment of the present disclosure, the control method for the home device further includes presetting a correspondence between the action of the user and the function performed by the home device. The correspondence between the function performed by the home device and the preset action is set in advance. The correspondence between the function of the home device and the preset action may be set according to actual needs.

By taking MI AI Speaker of Xiaomi as an example, it is set in advance that the action of raising the right arm corresponds to the function of increasing the volume, and the action of raising the left arm corresponds to the function of decreasing the volume. When the user raises the right arm, the MI AI Speaker will perform the function of increasing the volume.

Figure 4:
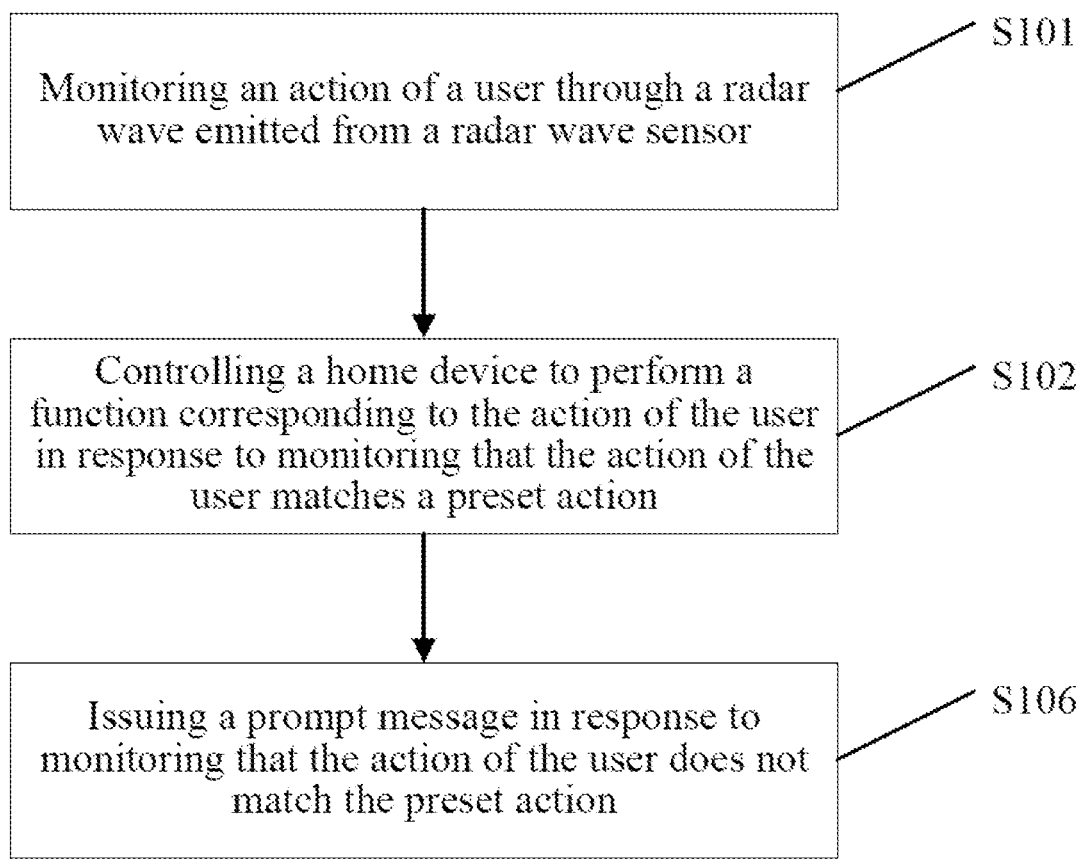
FIG. 4 is a flowchart of still another control method for a home device according to an exemplary embodiment of the present disclosure.

FIG. 4 is a flowchart of another control method for a home device according to an exemplary embodiment of the present disclosure.

As shown in FIG. 4, after step S102, the control method for the home device further includes step S106, and step S106 will be described below.

In step S106, prompt information is issued in response to monitoring that the action of the user does not match the preset action. The prompt information is used to prompt the user that the action of the user does not match the preset action. When it is detected that the action of the user does not match any of the preset actions, the prompt information may be issued.

In an embodiment, the prompt information may include at least one of vibration prompt information, indicator light prompt information, and voice prompt information. The voice prompt information may include the correspondence between the preset action and the function performed by the home device. In this way, the user may be prompted to which preset action corresponds to which function performed by the home device, so that the user may make a corresponding preset action according to his/her desired function of the home device to be performed.

Based on the same concept, an embodiment of the present disclosure further provides a control device for a home device.

It can be understood that, in order to realize the above-mentioned functions, the control device for the home device provided by the embodiment of the present disclosure includes a corresponding hardware structure and/or software module for performing respective functions. Units and algorithm steps of the examples disclosed in conjunction with the embodiments of the present disclosure may be implemented in the form of hardware or a combination of hardware and computer software in the embodiments of the present disclosure. A function is executed by hardware or computer software to drive hardware depends on the specific application and design constraint of the technical solution. A person skilled in the art may use different methods to implement the described function for each specific application, but such implementation should not be considered to go beyond the scope of the technical solution of the embodiments of the present disclosure.

Figure 5:
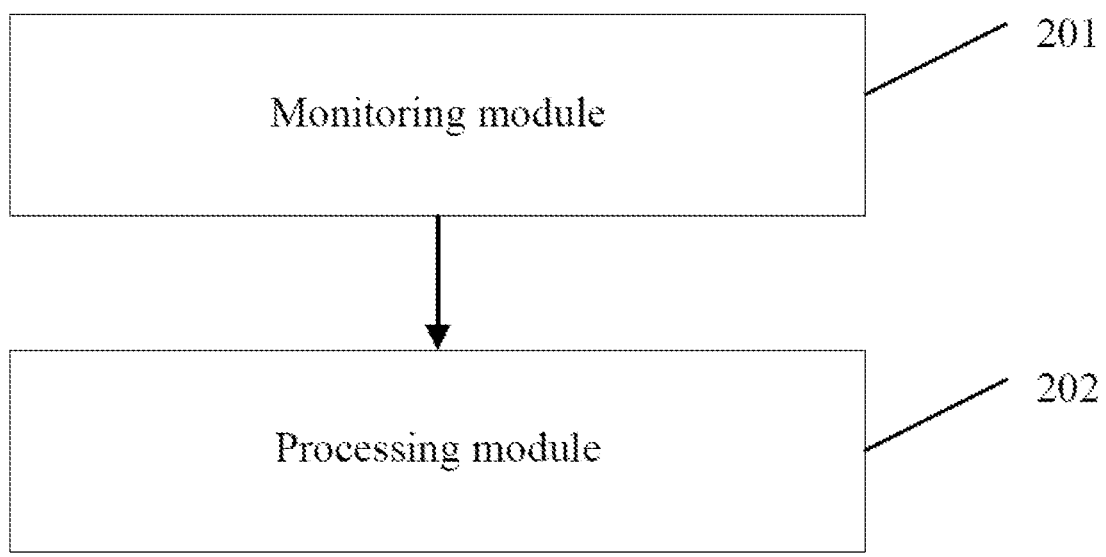
FIG. 5 is a block diagram of a control device for a home device according to an exemplary embodiment of the present disclosure.

FIG. 5 is a block diagram of a control device for a home device according to an exemplary embodiment of the present disclosure. As shown in FIG. 5, the control device for the home device can include a monitoring module 201 and a processing module 202. The monitoring module 201 and processing module 202 are described respectively below.

The monitoring module 201 is configured to monitor an action of a user through a radar wave emitted from a radar wave sensor.

The processing module 202 is configured to control the home device to perform a function corresponding to the action of the user in response to monitoring that the action of the user matches a preset action.

In an exemplary embodiment of the present disclosure, the monitoring module 201 can be further configured to recognize a distance between the user and the home device through the radar wave emitted from the radar wave sensor, and monitor the action of the user through the radar wave emitted from the radar wave sensor in response to recognizing by the radar wave sensor that the user is within a specified distance.

In an exemplary embodiment of the present disclosure, the monitoring module 201 can be further configured to recognize a body contour of the user through the radar wave emitted from the radar wave sensor, and determine that a recognized body contour is a specified body contour.

In an exemplary embodiment of the present disclosure, the monitoring module 201 is further configured to recognize a distance between the user and the home device through the radar wave emitted from the radar wave sensor; and the processing module 202 is further configured to control the home device to turn off power in response to recognizing by the radar wave sensor that the user is out of a specified distance.

In an exemplary embodiment of the present disclosure, the control device for the home device further includes a presetting module. The presetting module is configured to preset a correspondence between the action of the user and the function performed by the home device.

In an exemplary embodiment of the present disclosure, the processing module 202 is further configured to issue prompt information in response to monitoring that the action of the user does not match the preset action. The prompt information is configured to prompt the user that the action of the user does not match the preset action.

Regarding the device in the above embodiment, the specific manner in which each of the modules performs operations has been described in detail in the related method embodiments, and will not be set forth again here.

Figure 6:
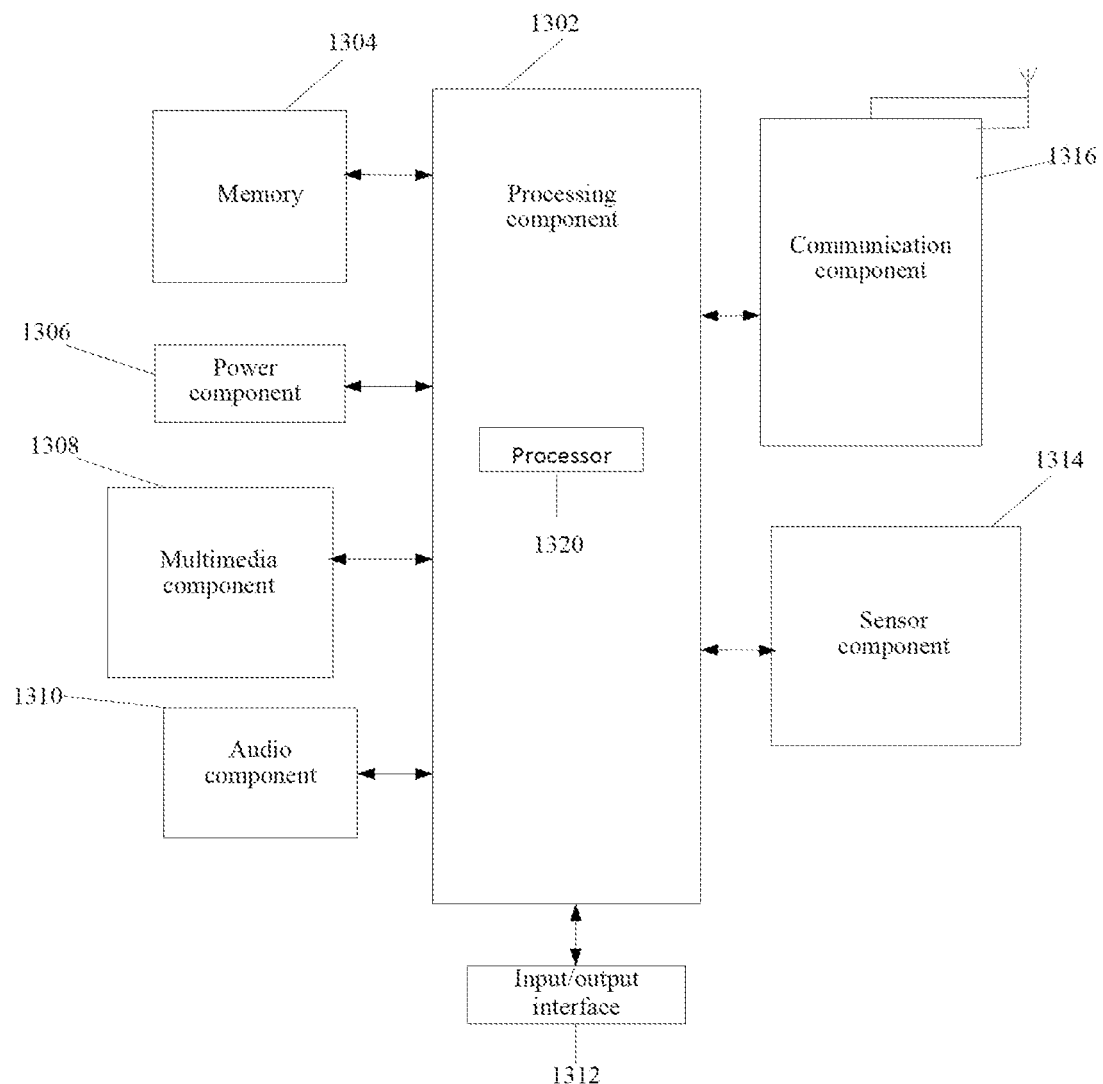
FIG. 6 is a block diagram of an apparatus for controlling a home device according to an exemplary embodiment of the present disclosure.

FIG. 6 is a block diagram of an apparatus for controlling a home device according to an exemplary embodiment. For example, the apparatus for controlling the home device may be a mobile phone, a computer, a digital broadcasting terminal, a messaging device, a game console, a tablet device, a medical device, a fitness device, a personal digital assistant, and the like.

Referring to FIG. 6, the apparatus for controlling the home device may include one or more of the following components a processing component 1302, a memory 1304, a power component 1306, a multimedia component 1308, an audio component 1310, an input/output (I/O) interface 1312, a sensor component 1314, and a communication component 1316.

The processing component 1302 generally controls the overall operation of the device, such as operation associated with display, telephone call, data communication, camera operation, and recording operation. The processing component 1302 may include one or more processors 1320 to execute instructions to complete all or part of the steps in the above method. In addition, the processing component 1302 may include one or more modules to facilitate interaction between the processing component 1302 and other components. For example, the processing component 1302 may include a multimedia module to facilitate interaction between the multimedia component 1308 and the processing component 1302.

The memory 1304 is configured to store various types of data to support the operation of the device. Examples of these data include instructions for any application or method for operating on the apparatus for controlling the home device, contact data, phone book data, messages, pictures, videos, etc. The memory 1304 may be implemented by any type of volatile or nonvolatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power component 1306 provides power to various components of the apparatus. The power component 1306 may include a power management system, one or more power supplies, and other components associated with generating, managing, and distributing power for the apparatus.

The multimedia component 1308 includes a screen that provides an output interface between the apparatus for controlling the home device and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touch, slide, and gesture on the touch panel. The touch sensor may not only sense the boundary of the touch or slide action, but also detect duration and pressure related to the touch or slide operation. In some embodiments, the multimedia component 1308 includes a front camera and/or a rear camera. When the device is in an operation mode, such as a shooting mode or a video mode, the front camera and/or the rear camera may receive external multimedia data. Each of the front camera and the rear camera may be a fixed optical lens system or have a focal length and an optical zoom capability.

The audio component 1310 is configured to output and/or input audio signals. For example, the audio component 1310 includes a microphone (MIC), and the microphone is configured to receive an external audio signal when the apparatus for controlling the home device is in an operation mode such as a calling mode, a recording mode, and a voice recognition mode. The received audio signal may be further stored in the memory 1304 or transmitted via the communication component 816. In some embodiments, the audio component 1310 further includes a speaker for outputting audio signals.

The I/O interface 1312 provides an interface between the processing component 1302 and a peripheral interface module. The peripheral interface module may be a keyboard, a click wheel, or a button. These buttons may include, but are not limited to, home button, volume button, start button, and lock button.

The sensor assembly 1314 includes one or more sensors for providing various aspects of status assessment for the apparatus for controlling the home device. For example, the sensor component 1314 may detect an on/off state of the apparatus, and relative positioning of the component (for example, the component is a display and a keypad of the apparatus for controlling the home device), and the sensor component 1314 may also detect position changing of the apparatus for controlling the home device or a component thereof, presence or absence of user contact with the apparatus for controlling the home device, orientation or acceleration/deceleration of the apparatus for controlling the home device, and temperature changing of the apparatus. The sensor assembly 1314 may include a proximity sensor configured to detect presence of a nearby object without any physical contact therewith. The sensor assembly 1314 may also include a light sensor, such as CMOS or CCD image sensor, for use in imaging applications. In some embodiments, the sensor assembly 1314 may further include an acceleration sensor, a gyro sensor, a magnetic sensor, a pressure sensor, or a temperature sensor.

The communication component 1316 is configured to facilitate wired or wireless communication between the apparatus and other devices. The apparatus for controlling the home device may access a wireless network based on any communication standard, such as WiFi, 2G or 3G or a combination thereof. In an exemplary embodiment, the communication component 1316 receives a broadcast signal or broadcast related information from an external broadcast management system via a broadcast channel. In an exemplary embodiment, the communication component 1316 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an exemplary embodiment, the apparatus for controlling the home device may be used by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic components to implement the above method.

In an exemplary embodiment, there is also provided a non-transitory computer-readable storage medium including instructions, such as the memory 1304 including the instructions, and the instructions can be executed by the processor 1320 of the apparatus for controlling the home device to complete the above method. For example, the non-transitory computer-readable storage medium may be ROM, random access memory (RAM), CD-ROM, magnetic tape, floppy disk, optical data storage device, or the like.

In an exemplary embodiment, there is also provided a non-transitory computer-readable storage medium including instructions, such as the memory 1304 including the instructions, and the instructions can be executed by the processor 1320 of the apparatus for controlling the home device to complete the above method. For example, the non-transitory computer-readable storage medium may be ROM, random access memory (RAM), CD-ROM, magnetic tape, floppy disk, optical data storage device, or the like.

It can be further understood that in the present disclosure, "a plurality" refers to two or more, and other quantifiers have similar meanings. When describing the relationship between objects, "and/or" indicates that there may be three kinds of relationships, for example, A and/or B may indicate three conditions of only A, both A and B, and only B. The character "I" generally indicates that the related objects before and after the same has an "or" relationship. Singular form "a", "said" and "the" is also intended to include the plural form unless indicated otherwise in the text.

It can be further understood that although the embodiments of the present disclosure describe the operations in a specific order in the drawings, it should not be construed as that the operations shall be performed in the specific order shown or in a serial order, or that all the operations shown shall be performed to achieve a desired result. In certain environments, multitasking and parallel processing may be advantageous.

Those skilled in the art may easily conceive of other embodiments of the present disclosure after considering the specification and practicing the invention disclosed herein. The present application is intended to cover any variations, uses, or adaptive changes of the present disclosure that follow the general principle of the present disclosure and include common general knowledge or customary technical means in the technical field not disclosed in the present disclosure. The description and examples are to be considered exemplary only, and the true scope and spirit of the present disclosure are pointed out by the appended claims.

It should be understood that the present disclosure is not limited to the precise structure that has been described above and shown in the drawings, and various modifications and changes may be made without departing from the scope thereof. The scope of the present disclosure is limited only by the appended claims.

What is claimed is:

1. A control device for a home device, comprising:
   a memory that is configured to store instructions; and
   a processor that is configured to call the instructions to execute a control method for the home device, comprising:
   recognizing a body contour of a user through a radar wave emitted from the radar wave sensor;
   determining whether a recognized body contour is a specified body contour or not;
   in response to determining that the recognized body contour is the specified body contour, monitoring an action of the user through the radar wave emitted from the radar wave sensor;
   controlling the home device to perform a function corresponding to the action of the user when the action of the user matches a preset action;
   recognizing a distance between the user and the home device through the radar wave emitted from the radar wave sensor;
   in response to determining that the user is within a first specified distance, monitoring the action of the user through the radar wave emitted from the radar wave sensor, and controlling the home device to perform the function corresponding to the action of the user when the action of the user matches the preset action; and
   in response to determining that the user is outside the first specified distance, monitoring the action of the user through the radar wave emitted from the radar wave sensor, and controlling the home device to not perform the function corresponding to the action of the user when the action of the user matches the preset action.

2. The control device for the home device according to claim 1, wherein the control method for the home device further comprises:

controlling the home device to turn off power when the user is out of a second specified distance.

3. The control device for the home device according to claim 1, wherein the control method for the home device further comprises:

presetting a correspondence between the action of the user and the function performed by the home device.

4. The control device for the home device according to claim 1, wherein the control method for the home device further comprises:

issuing prompt information when the user does not match the preset action, wherein the prompt information is configured to prompt the user that the action of the user does not match the preset action.

5. A non-transitory computer-readable storage medium having stored thereon computer-executable instructions that, when executed by a processor, execute a control method for a home device comprising:

recognizing a body contour of a user through a radar wave emitted from the radar wave sensor;

determining whether a recognized body contour is a specified body contour or not;

in response to determining that the recognized body contour is the specified body contour, monitoring an action of the user through the radar wave emitted from the radar wave sensor;

controlling the home device to perform a function corresponding to the action of the user when the action of the user matches a preset action;

recognizing a distance between the user and the home device through the radar wave emitted from the radar wave sensor;

in response to determining that the user is within a first specified distance, monitoring the action of the user through the radar wave emitted from the radar wave sensor, and controlling the home device to perform the function corresponding to the action of the user when the action of the user matches the preset action; and in response to determining that the user is outside the first specified distance, monitoring the action of the user through the radar wave emitted from the radar wave sensor, and controlling the home device to not perform the function corresponding to the action of the user when the action of the user matches the preset action.

6. The non-transitory computer-readable storage medium according to claim 5, wherein the control method for the home device further comprises:

controlling the home device to turn off power when the user is out of a second specified distance.

7. The non-transitory computer-readable storage medium according to claim 5, wherein the control method for the home device further comprises:

presetting a correspondence between the action of the user and the function performed by the home device.

8. The non-transitory computer-readable storage medium according to claim 5, wherein the control method for the home device further comprises:

issuing prompt information when the user does not match the preset action, wherein the prompt information is configured to prompt the user that the action of the user does not match the preset action.

* * * * *